No. 607,100. Patented July 12, 1898.
W. M. WADLEIGH.
HARVESTER, REAPER, &c.
(Application filed Mar. 14, 1896.)
(No Model.)
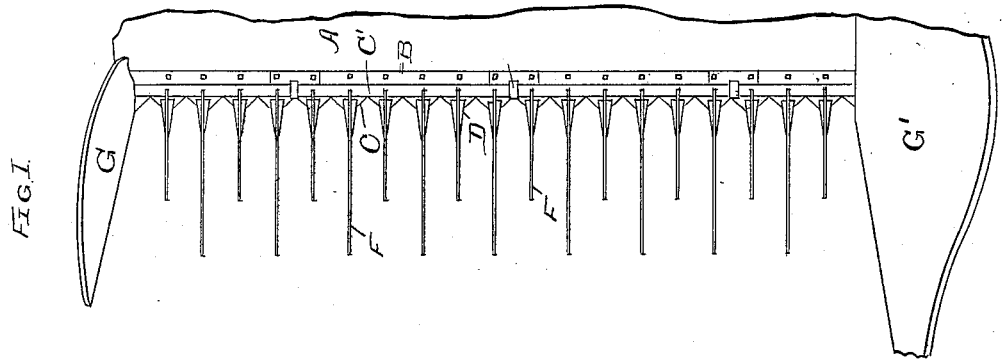
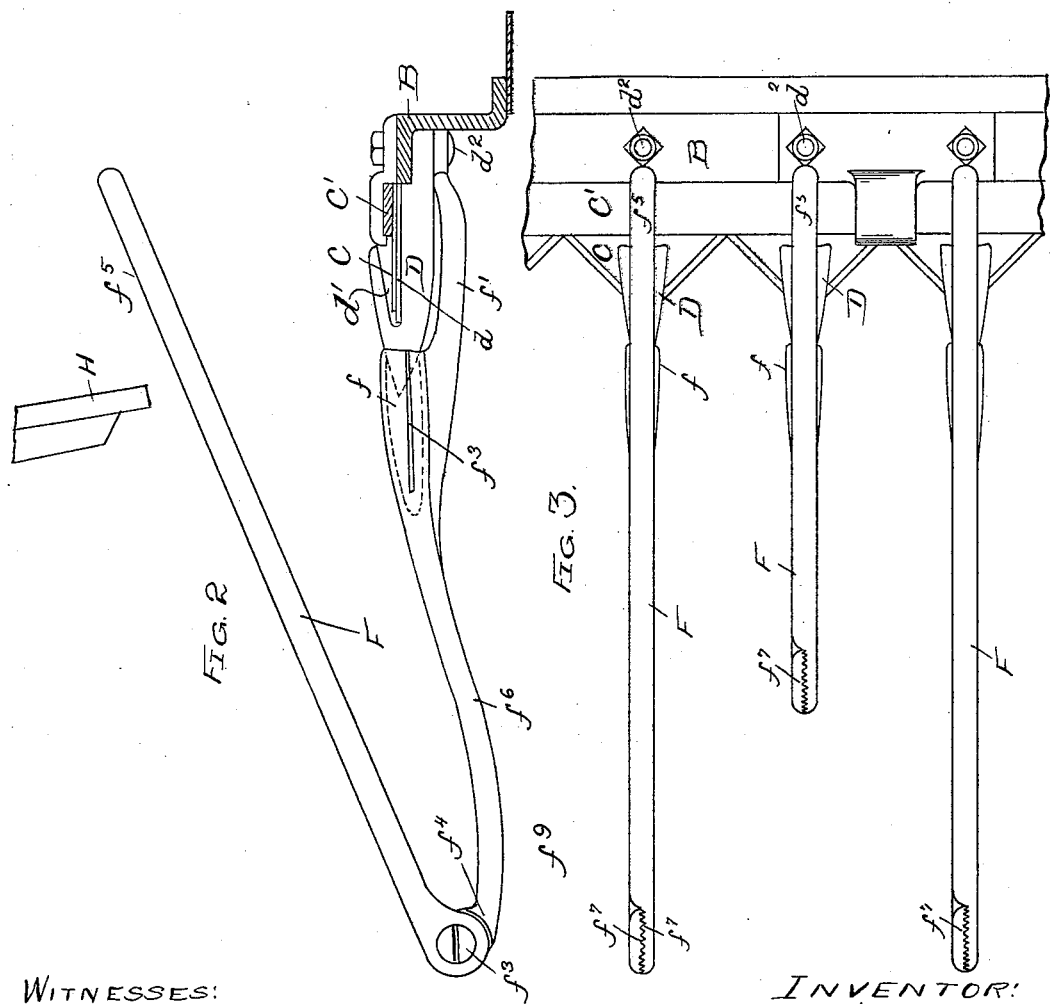
WITNESSES:
Sew. C. Curtis
H. W. Munday
INVENTOR:
WILLIAM M. WADLEIGH
BY Munday, Evarts & Adcock
HIS ATTORNEYS.

UNITED STATES PATENT OFFICE.

WILLIAM M. WADLEIGH, OF MILKS GROVE, ILLINOIS.

HARVESTER, REAPER, &c.

SPECIFICATION forming part of Letters Patent No. 607,100, dated July 12, 1898.

Application filed March 14, 1896. Serial No. 583,236. (No model.)

*To all whom it may concern:*

Be it known that I, WILLIAM M. WADLEIGH, a citizen of the United States, residing in Milks Grove township, in the county of Iroquois and State of Illinois, have invented a new and useful Improvement in Harvesters, Reapers, and other Like Machines, of which the following is a specification.

My invention relates to harvesters, reapers, and other like machines for cutting grains, seed-grasses, or other crops.

My object is to provide means for enabling harvester and like machines to cut and save down, lodged, or crinkled grains or crops, and which may be conveniently and quickly applied to or removed from the ordinary or customary constructions of harvesters and machines now in use.

My invention consists in the novel construction of parts and devices and novel combinations of parts and devices herein shown and described, and more particularly pointed out in the claim.

In the accompanying drawings, which form a part of this specification and in which similar letters of reference indicate like parts, Figure 1 is a plan view of a portion of a harvester with my invention applied. Fig. 2 is a vertical section showing, on a larger scale, my device for elevating down or lodged or crinkled grain in elevation. Fig. 3 is an enlarged detail plan view.

In the drawings, A represents the platform of a harvester; B, the finger-bar; C, the sickle; C', the sickle-bar; D D, the fingers, guards, or finger-guards within which the sickle reciprocates; G, the inner and G' the outer divider, and H one of the wings of the reel. All these parts are or may be of any well-known or suitable construction.

The finger-guards D have the customary cutting edges $d\ d$ to coöperate with the knives or sections of the sickle and slot $d'$.

F F are the devices which I employ for elevating or raising the lodged or down or crinkled grains or crops above the sickle or cutting mechanism of the machine as it advances. The device F, I for convenience designate as an "elevating-guard" to distinguish it from the ordinary guard or finger-guard D, within which the sickle reciprocates and which forms part of the cutting mechanism, coacting, as it does, with the sickle. The elevating-guard F is provided with a socket $f$ to adapt it to fit over the point or tapering ends of the finger-guards or guards D, and also with a shank or strap $f'$, extending under the guard D and back to the bolt $d^2$, by which the guard is secured to the finger-bar B, the strap or shank $f'$ having a hole for the bolt $d^2$ to pass through, so that one and the same bolt may serve to secure the finger-guard D and its extension or elevating-guard F both to the finger-bar B. The socket $f$ should be slit at $f^3$, so that the size of the socket may be readily increased with a conical wedge or diminished by cold-hammering to make it fit properly the different sizes, lengths, and shapes of fingers or guards D used on the different makes of harvesters now commonly in use.

Each alternate elevating-guard F should project, preferably, about one foot, more or less, in advance of the point or forward end of the finger-guard D, and the lower or supporting member $f^6$ thereof should incline or extend downwardly, so that the point or nose $f^4$ of the elevating-guard will be about on a level with the platform A of the harvester or other machine. The elevating-guard F extends upward and backward at an inclination or angle to the general plane or direction of the finger-guards and platform, so that as the nose $f^4$ of the elevating-guard is projected under the down, fallen, lodged, or crinkled grain or crop the same will be raised by riding on the inclined upper edge of the elevating-guard as it advances under the same. The rear end $f^5$ of the elevating-guard is preferably elevated from three to six inches, more or less, above the finger-guards, depending upon the length and condition of the crop being operated upon.

To enable the inclination of the elevating-guard to be readily adjusted as may be required, I prefer to secure it to its lower or supporting member $f^6$, which is attached to the finger-bar or finger-guard by a clutch pivot-joint. This adjustable joint between the elevating-guard and the lower or supporting member $f^6$ preferably comprises radial teeth, notches, or serrations $f^7\ f^7$ on the two meeting faces of the elevating-guard F and lower member $f^6$ and a screw-threaded stove bolt or screw $f^8$ for clamping the two together.

By this means the inclination of the inclined elevating-guard F may be changed as desired. The lower member $f^6$ of the elevating-guard is preferably provided with a slight curve, runner, or shoe shape $f^9$ near the rounded nose or point $f^4$ of the elevating-guard to prevent the elevating-guard from digging or plowing too deeply into the ground when the platform of the harvester is tilted to cause the points or noses of the elevating-guards to ride upon or enter slightly the ground in order to take up and raise and enable the machine to cut and save grains or crops pressed flat upon the ground.

The elevating-guards F may in operation be placed upon or in operative relation to any desired number of finger-guards D D between the inner and outer dividers G G'. Ordinarily it is sufficient to place these elevating-guards upon each alternate finger-guard, but a greater or less number may be employed, according to the particular condition of the grain or crop. In some cases, especially with short and badly downed and tangled grain, better results can be secured by mounting the elevating-guards upon every finger-guard between the dividers. In such cases, however, I prefer to make each alternate elevating-guard somewhat shorter than the others, as is clearly shown in the drawings at Figs. 1 and 3. The alternate short elevating-guards, excepting in the mere matter of length, may be the same in form and construction as that of the long ones. Ordinarily, however, I prefer in the short guards to omit the slight upward curve or runner shape or shoe shape $f^9$ near the nose or point $f^4$ of the elevating-guard, as these shorter guards will be prevented by the longer ones from entering too deeply into the ground. The point or nose $f^4$ of the elevating-guard is made rounding, preferably about as indicated in the drawings, to prevent any tendency for stalks or rubbish to lodge or catch upon the points. This tendency is also prevented by the uneven length of the elevating-guards.

By reason of the sockets $f$, with which the elevating-guards are provided and which are themselves adjustable to fit different lengths, shapes, and sizes of finger-guards, and the means for removably attaching the elevating-guards upon or to the finger-guards I am able to apply my elevating-guards to any ordinary harvester or machine now in use without changing the machine in the least or removing or replacing the ordinary finger-guards with which such machines are provided. This is a great practical convenience to the user of the machine and also saves expense, as the finger-guards themselves do not have to be duplicated.

I claim—

In a harvester or like machine, the combination with a finger-guard of an elevating-guard having a lower or supporting member to which the elevating-guard is adjustably secured by a clutch-joint or pivot-bolt at its nose or rounded point, substantially as specified.

WILLIAM M. WADLEIGH.

Witnesses:
   H. M. MUNDAY,
   EDMUND ADCOCK.